US012705194B2

(12) United States Patent
Balasubramanian

(10) Patent No.: US 12,705,194 B2
(45) Date of Patent: Aug. 11, 2026

(54) METHODS AND SYSTEMS FOR ACCELERATING PIXEL PROCESSING

(71) Applicant: Infineon Technologies AG, Neubiberg (DE)

(72) Inventor: Prakash Balasubramanian, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 256 days.

(21) Appl. No.: 17/888,589

(22) Filed: Aug. 16, 2022

(65) Prior Publication Data

US 2024/0061797 A1 Feb. 22, 2024

(51) Int. Cl.
*G06F 13/28* (2006.01)
*G06K 7/10* (2006.01)

(52) U.S. Cl.
CPC ......... *G06F 13/28* (2013.01); *G06K 7/10722* (2013.01)

(58) Field of Classification Search
None
See application file for complete search history.

(56) References Cited

U.S. PATENT DOCUMENTS 6,493,803 B1 * 12/2002 Pham ...................... G06F 13/28 711/155
6,611,883 B1 * 8/2003 Avery ...................... G06F 13/28 710/52
6,678,755 B1 * 1/2004 Peterson ................. G06F 13/28 710/24
7,506,079 B2 * 3/2009 Sugimoto ............. G06F 13/385 710/21
7,660,916 B2 * 2/2010 Moskalev .............. G06F 13/28 710/22
9,658,975 B2 * 5/2017 Fernald ................... G06F 13/28
11,409,685 B1 * 8/2022 Kaplan ............... H04L 67/1095
11,630,601 B2 * 4/2023 Yi ......................... G06F 3/0659 711/154
11,768,504 B2 * 9/2023 Ebrahimi Afrouzi .. G06N 3/084 701/25
2014/0282510 A1 * 9/2014 Anderson ........... G06F 9/45558 718/1
2021/0303199 A1 * 9/2021 Horspool ............. G06F 3/0614
2021/0389950 A1 * 12/2021 Poole .................... G06F 9/3802
2022/0026920 A1 * 1/2022 Ebrahimi Afrouzi .. G06N 3/045
2022/0066456 A1 * 3/2022 Ebrahimi Afrouzi ........................ B25J 9/1697
2022/0187841 A1 * 6/2022 Ebrahimi Afrouzi ........................ G05D 1/0242
2022/0283732 A1 * 9/2022 Yi ......................... G06F 3/0659

(Continued)

OTHER PUBLICATIONS

Automatic Image Tagging Model Based on Multigrid Image Segmentation and Object Recognition. Published on Dec. 22, 2014.

*Primary Examiner* — Henry Tsai
*Assistant Examiner* — Christopher A Bartels
(74) *Attorney, Agent, or Firm* — Eschweiler & Potashnik, LLC

(57) ABSTRACT

An image processing system, includes an image sensor, a bus structure coupled to the image sensor, and a system memory coupled to the image sensor via the bus structure. A direct memory access (DMA) controller is coupled to the bus structure. The DMA controller includes in-line logic hardware configured to retrieve raw pixel data from the image sensor, and internally process the retrieved raw pixel data thereby providing processed pixel data.

15 Claims, 7 Drawing Sheets

(56) References Cited

U.S. PATENT DOCUMENTS

2023/0206104 A1* 6/2023 Rab ........................ G06N 10/40
716/100

* cited by examiner

METHODS AND SYSTEMS FOR ACCELERATING PIXEL PROCESSING

FIELD

The present disclosure relates in general to electronic image processing systems.

BACKGROUND

With the advancement of imaging techniques such as automotive radar, facial recognition, and others; computer vision is becoming more and more common-place in society. Traditionally, a computer vision pipeline includes several stages. First, image data is acquired, for example by opening a shutter of a camera or other imaging device and exposing photodetectors on an integrated circuit to light passing through an aperture revealed by the shutter. Second, the image data is processed to determine light intensity and/or color for each pixel of the image. Third, the pixels may be further evaluated to segment the image data into multiple discrete regions. Fourth, for each region, specific image features can be extracted. For example, dark image features in the foreground of the image can be extracted from a light background of the image; and/or bright or colored features could be extracted from other features. For instance, red features (e.g., a stop sign or firetruck) and/or yellow features (e.g., a caution sign or traffic light) can be extracted from an image. Lastly, the extracted features can be analyzed to classify the shape of a detected object (e.g., red octagon is a stop sign); and action can be taken in response to the detected object. For example, if the computer vision system is mounted on a car and the detected object is a stop sign, the computer vision system can provide a signal to warn the driver to stop and/or can stop the car if the driver fails to do so.

The present disclosure provides techniques for accelerating pixel processing, and thus, aims to improve computer vision as well as other imaging techniques.

DETAILED DESCRIPTION

Figure 1:
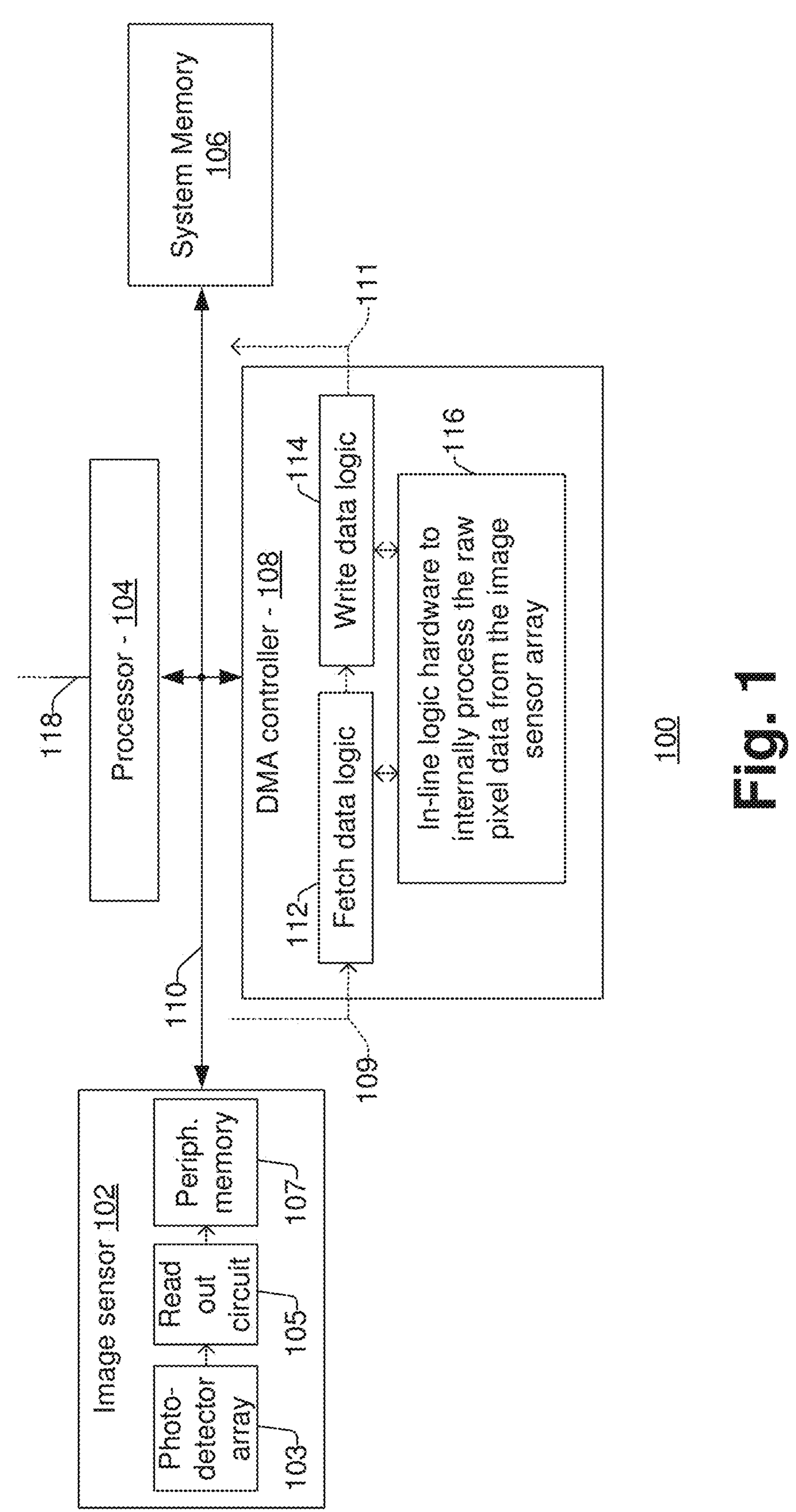
FIG. 1 illustrates an image processing system that includes a DMA controller according to some embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

As successive generations of image processing systems become more advanced, ongoing increases in data processing speed is needed. For example, to more accurately detect and characterize objects, image processing systems often use higher resolution images. Moreover, to detect subtle changes in the movement of those detected objects over a small time interval and/or make rapid decisions with regards to those detected objects, the image processing system ideally evaluate the images at faster frame rates. Thus, from a system perspective, faster processing of image data is needed in many regards. Therefore, the present disclosure provides techniques for accelerating pixel processing, and aims to help advance image processing systems, particularly in the field of computer vision.

FIG. 1 shows an image processing system 100 that includes an image sensor 102, a processor 104, a system memory 106, and a DMA controller 108, which are operably coupled to one another by a bus structure 110. The image sensor 102 includes a photodetector array 103, read-out circuit 105, and peripheral memory 107. The read-out circuit 105 has an input coupled to an output of the photodetector array 103 and has an output coupled to the peripheral memory 107.

The photodetector array 103 includes an array of photodetectors (e.g., a grid of photodiodes or charge coupled devices), and color filters are disposed over the respective photodetectors such that each photodetector or group of photodetectors corresponds to a pixel. The read-out circuit 105 includes an analog-to-digital converter (ADC) and can provide a digital measured light intensity for each photodetector of the photodetector array 103. The digital measured light intensity for each pixel is then stored in the peripheral memory 107. The peripheral memory 107 can manifest as a random access memory (RAM), shift register, a first-in-first-out (FIFO) memory, a last-in-first out (LIFO) memory, or other memory.

During operation, the image sensor 102 generates raw pixel data during a series of timeslots, during which a mechanical or electrical shutter is operated to generate an image for each timeslot. The raw pixel data can correspond to an image that is a single frame of a video, and multiple images stored in time can store successive frames of the video in time. Thus, as light strikes the photodetector array 103, each photodetector provides a respective light intensity signal for a given time slot, and the ADC of the read-out circuit 105 converts these light intensities to digital pixel data which is stored in the peripheral memory 107. For example, if the image includes a "bright" object in the foreground and a "dark" shadow behind the object, the pixels corresponding to the "bright" object can have a high/large light intensities while the pixels corresponding to the "dark" shadow" can have a low/small light intensities. Because the peripheral memory 107 is finite in size and image data continually arrives as video is taken, the raw pixel data stored in the peripheral memory 107 is processed and moved to the system memory 106 in time.

Although some approaches could have the processor 104 move the raw pixel data from the image sensor 102 over the bus structure 110 to the system memory 106, the large number of pixels and the high frequency at which they are generated could consume large portions of bus bandwidth and/or the processor bandwidth, leading to "bottleneck" issues. The Direct Memory Access (DMA) controller 108 helps to alleviate such "bottleneck" issues. In particular, the DMA controller 108 is programmed to transfer the raw pixel data generated by the image sensor 102 to the system memory 106 over the bus structure 110 without intervention from the processor 104 during the transfer. In this way, the DMA controller 108 can free up the processor 104 for other tasks while the DMA controller 108 is moving the raw pixel data from the peripheral memory 107 to system memory 106. To accomplish this, the DMA controller 108 includes fetch data logic 112 that retrieves raw pixel data from the peripheral memory 107 over the bus structure 110 (see arrow 109), and also includes write data logic 114 that receives the raw pixel data from the fetch data logic 112 and writes the raw pixel data to system memory 106 (see arrow 111). Thus, the DMA controller 108 can ensure the raw pixel data from the image sensor 102 is continuously moved to keep us with the real-time demands of the image sensor 102, while helping to limit the processor 104 from being overloaded.

As has been appreciated in some aspects of the present disclosure, although other image processing systems may use a DMA controller, there can still be significant bus overhead and/or processor overhead when processing the raw pixel data in such systems. Therefore, in the present disclosure, the DMA controller 108 is configured to be programmed to retrieve raw pixel data from the peripheral memory 107 of the image sensor 102, and in-line logic hardware 116 internally processes the retrieved raw pixel data within the DMA controller 108, thereby providing processed pixel data. After processing the retrieved raw pixel data in-line, the DMA controller 108 can then write the raw pixel data to system memory 106 (see arrow 111) and/or can provide the processed pixel data to the processor 104, system memory 106, and/or other locations, such that image processing system 100 provides accelerated throughput compared to other approaches.

In the illustrated example, the bus structure 110 is illustrated as a single bus that directly connects the image sensor 102, the system memory 106, and the processor 104, but in other examples, there could be separate/split busses between the image sensor 102, processor 104, system memory 106, and/or DMA controller 108. For example, the processor 104 can also interface to other peripherals via another bus structure 118, such that when the DMA controller 108 is fetching the raw pixel data from the image sensor 102 and writing to the system memory 106 over the bus structure 110, the processor 104 can use the other bus structure 118 at the same time to help with system throughput. The image sensor 102, system memory 106, and/or DMA controller 108 can also have additional, un-illustrated bus structures they use to interface with other system components, and thus, all such variations are contemplated as falling within the scope of this disclosure.

Further still, in many cases, the image sensor 102, the processor 104, the system memory 106, the DMA controller 108, and bus structure 110, are each disposed on a single monocrystalline silicon substrate in which photodetectors and/or transistors are formed. In other cases, these components can be distributed over multiple semiconductor substrates that are stacked as a three-dimensional (3D) IC or can be included on multiple discrete integrated circuits that are coupled together via electrical traces on a printed circuit board. In a 3D IC, the multiple monocrystalline silicon substrates and/or other semiconductor substrates are stacked over one another and/or beside one another, and interconnect structures that include insulating layers as well as wiring layers and vias are disposed between the various semiconductor substrates to couple the transistors and/or photodetectors to one another; and these substrates and interconnect structures are arranged in a single package made of ceramic, plastic, or the like for high-level integration.

Figure 2:
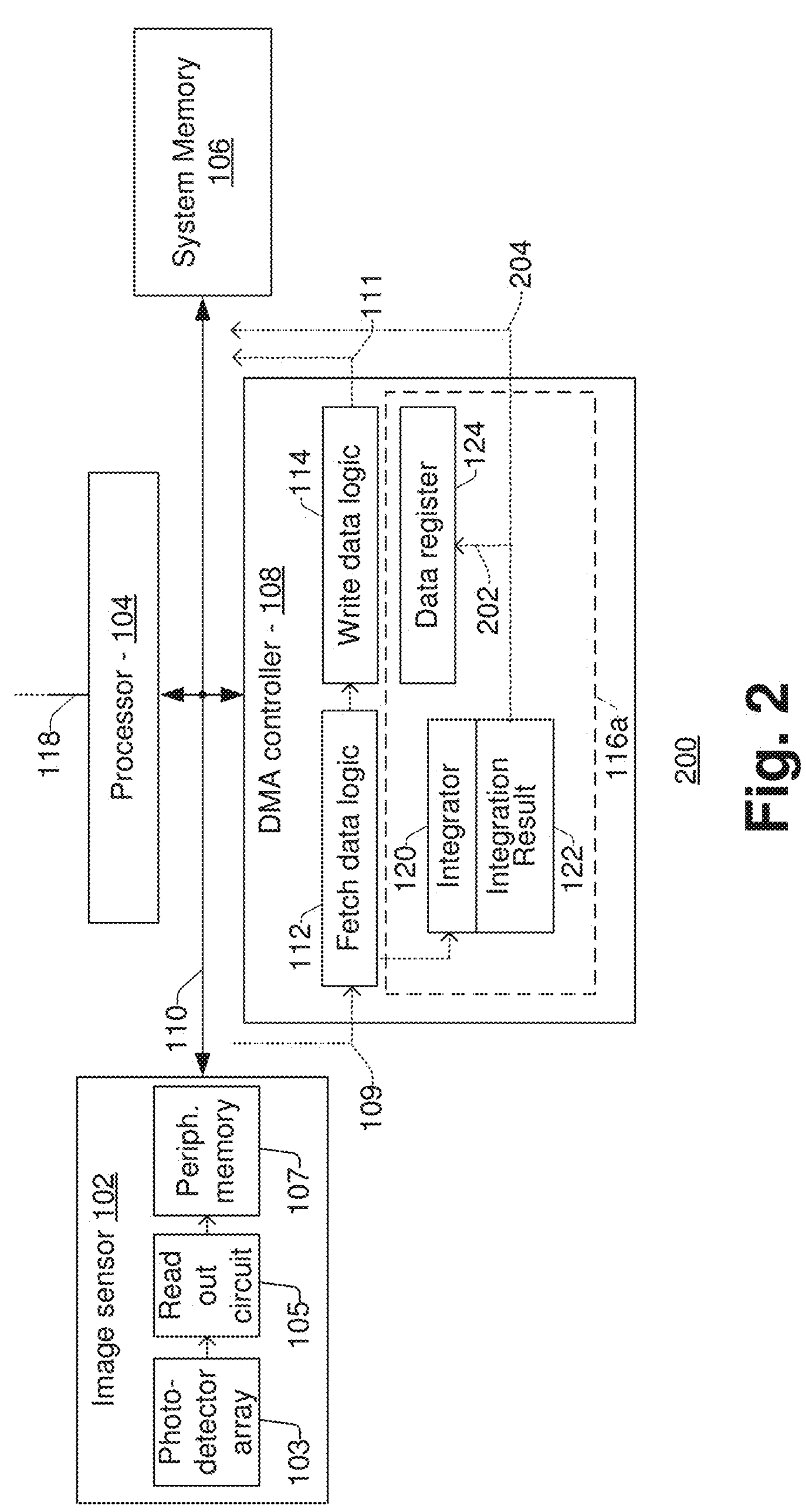
FIG. 2 illustrates an image processing system that includes a DMA controller configured to accelerate computation of a mean light intensity for an image according to some embodiments.

Turning to FIG. 2, one can see a more detailed depiction of an image processing system 200 including in-line hardware logic **116*a* configured to accelerate computation of a mean intensity for an entire image or for a portion of an image. In this example, in addition to fetch data logic 112 write data logic 114, the DMA controller 108 includes an integrator 120, a memory element 122 coupled to an output of the integrator 120, and a data register 124. The memory element 122** can manifest as a register (e.g., a flip-flop), group of registers, or a memory array, such as a flash memory array, static random access memory (SRAM) array, resistive random access memory (RRAM), phase change memory array (PCRAM) or other memory.

During operation, as the fetch data logic 112 retrieves successive raw pixel data from the image sensor 102 over the bus structure 110, the integrator 120 sums light intensities for the respective raw pixel data during a first image timeslot corresponding to a first image. The integrator 120 then stores the integration result for the raw pixel data in the memory element 122. The integration result can then be written to the data register 124 (see arrow 202), and/or can be written to system memory 106 (see arrow 204). While the integrator 120 is integrating the light intensities of the raw pixel data, the write data logic 114 is also writing the fetched raw pixel data to system memory 106. Hence, after the DMA controller has completed writing the raw pixel data pertaining to the first image to system memory 106, the DMA controller 108 can signal to the processor 104 that the transfer is complete. This can be achieved by the DMA controller 108 flagging an interrupt (which triggers the processor 104 to know the transfer is complete). Alternatively, in cases where an interrupt is not used, the DMA controller 108 can include status registers that indicate the transfer is complete, and the processor 104 can repeatedly read (e.g., "poll") the status registers of the DMA controller 108 to determine the transfer is complete. In either case, when the processor 104 learns the transfer is complete, the processor 104 can simply read the integration result from the data register 124 and/or system memory 106, and then can divide the integration result by the number of pixels in the first image to provide a mean light intensity for the first image.

In comparison, under other approaches without the in-line logic hardware 116, to compute the mean intensity for the first image, the processor 104 would need to perform a series of read operations to read the raw pixel data from system memory 106, and then perform a series of add and store operations to integrate/add the light intensities of the raw pixel data, and such an approach can consume significant bus bandwidth and/or processor bandwidth. Therefore, by having the DMA controller 108 perform the integration in-line on streaming raw pixel data, the DMA controller 108 offers significant acceleration for the image processing system as a whole, thereby allowing for higher resolution images to be processed at higher frame rates.

Figure 3:
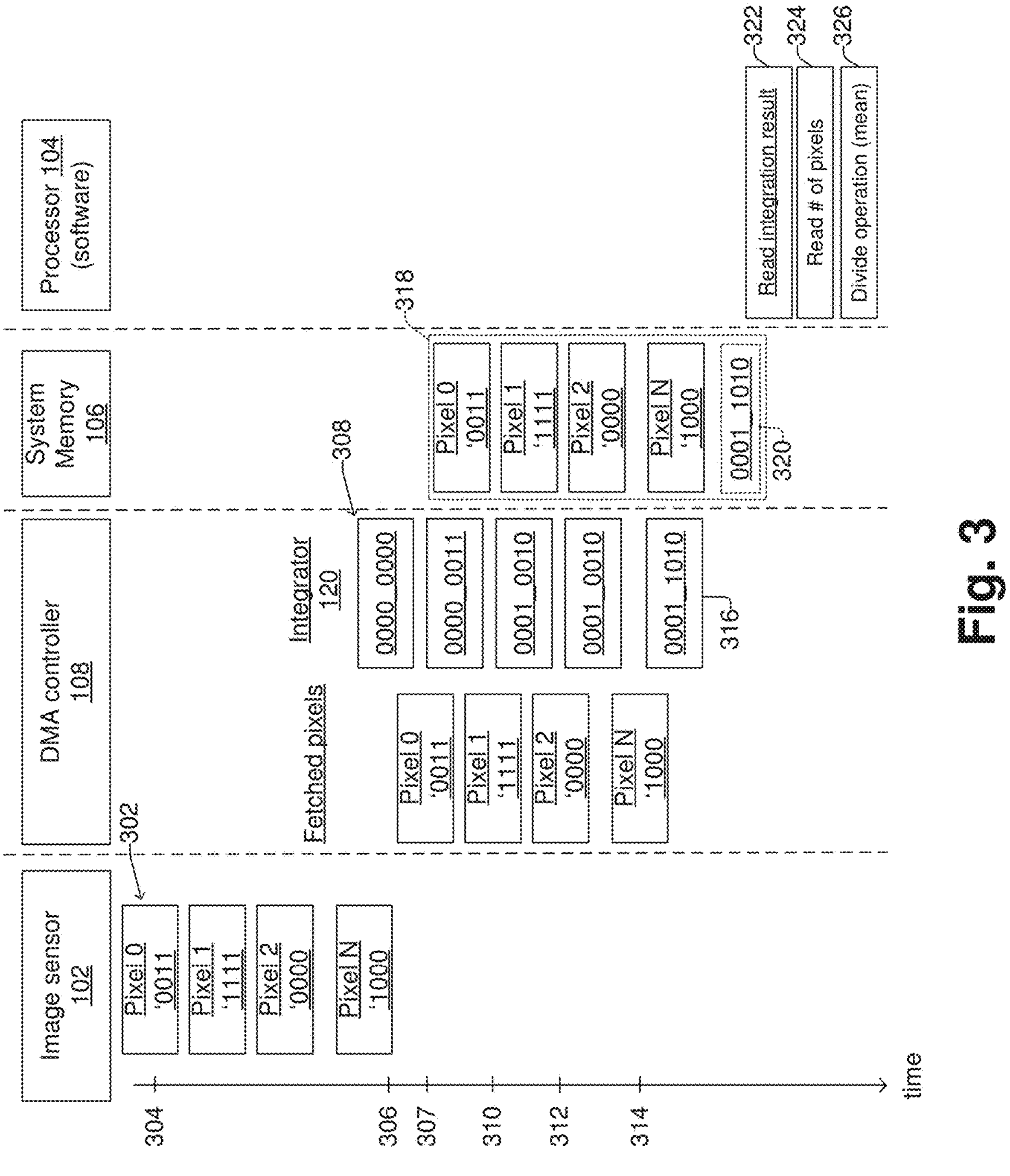
FIG. 3 illustrates a data processing diagram consistent with some examples of FIG. 2.

FIG. 3 illustrates a more detailed example where raw pixel data is processed in the image processing system in time. This example shows N pixels 302 (Pixel 0, Pixel 1, Pixel 2, . . . , Pixel N) being received starting at time 304 at the image sensor 102. In some instances, the raw data for the N pixels will be generated simultaneously (all pixels of the image are generated at one time), while in other cases, the raw data for the N pixels will be generated in serial (over time) as shown. When generated, each pixel has a respective light intensity, and the light intensities vary among the pixels. For illustrative purposes in this example, the light intensity of each pixel is illustrated as a four bit word, though more often, light intensities for a pixel will have larger number of bits, but smaller number of bits are also possible. For example, Pixel 1 has a very high light intensity (b'1111), while pixel 2 has a very low light intensity (b'0000).

At time 306, the integrator 120 can be reset (e.g., set to a value of b'0000_0000 in this example), and the write logic of DMA controller 108 begins to fetch the pixel data from the image sensor 102 over the bus structure. In some cases, the DMA controller 108 can make use of a set of descriptors and linked lists to read the pixel data from the image sensor 102 and/or write the pixel data to the system memory 106. In other cases, however, the DMA controller does not make use of descriptors and/or linked lists, but rather merely reads the pixel data from the image sensor 102 and writes the pixel data directly to the system memory 106. As the DMA controller fetches the pixel data (e.g., words), the integrator internally performs integration/accumulation of the pixel data as it is fetched. Thus, as Pixel 0 with light intensity of b'0011 (decimal 3) is fetched at time 307, the integration result in the integrator is updated at time 308 to b'0000_0011 (decimal 3). As Pixel 1 with light intensity b'1111 (decimal 15) is fetched at time 310, the integrator updates the integration result to b'0001_0010 (decimal 3+15=18). As Pixel 2 with light intensity b'0000 (decimal 0) is fetched at time 312, the integrator updates the integration result to b'0001_0010 (decimal 3+15+0=18). As Pixel N is fetched at time 314 (assuming N=3), then integrator updates the integration result to b'0001_1010 at 316 (decimal 3+15+0+8=26).

Further, after each pixel word is fetched, the pixel word is written to out to the system memory 106 by the write data logic 114 over the bus structure 110 (see 318). Thus, the writing of the pixel data for an image to system memory 106 is often concurrent to integration of pixel data for that image, which helps to accelerate the processing of image data in the system.

Lastly, once the calculation of the integration result is completed for N pixels, the DMA can provide the integration result 316 to the processor 104. Under one approach, upon completion of calculation of the integration result, the DMA can display the integration result in a DMA status register. In an alternate approach, the DMA controller 108 can write the integration result to system memory (see 320).

The processor 104 can subsequently read the integration result in 322. In some cases, the processor 104 can read the integration result by reading the DMA status register over the bus structure 110. In another approach, the DMA controller can write the integration result to system memory 106 (see 320)—for example to a predetermined address known to the processor in the system memory 106—and then the processor can simply read the integration result from that predetermined address. In still another approach, the DMA controller can write the integration result to a location in the system memory (see 320), and the DMA status register can display the address in the system memory where the DMA controller wrote the data. In this third case, the processor initially reads the address from the DMA status register upon learning the transfer is completed, then retrieves the integration result from system memory at the address specified in the DMA status register.

At time 324, the processor reads a number of pixels that corresponds to the completed transfer, and at 326 performs a divide operation whereby the integration result is divided by number of pixels to obtain a mean for the retrieved raw pixel data. It will be appreciated that compared to other approaches where the light intensities of the pixels are individually integrated in separate read/add//stores by the processor, the DMA controller 108 with dedicated in-line logic hardware 116 provides a significant improvement for image processing and computer vision.

Although FIG. 3 shows an example where the DMA controller 108 only fetches pixel data after the Nth pixel has been generated at image sensor 102, in other examples, pixels could be fetched by DMA controller as the image is being taken (e.g., before pixel N is generated) and/or can be fetched over sporadic times depending on bus availability (same with writes from DMA controller 108 to system memory 106), depending on bus availability. Similarly, although FIG. 3 shows an example where the DMA controller 108 writes pixel data immediately after it is integrated, in other cases, writing of this pixel data could be before integration takes place depending on latency within the DMA or could be delayed by various amounts, depending on bus availability.

Figures 4, 5:
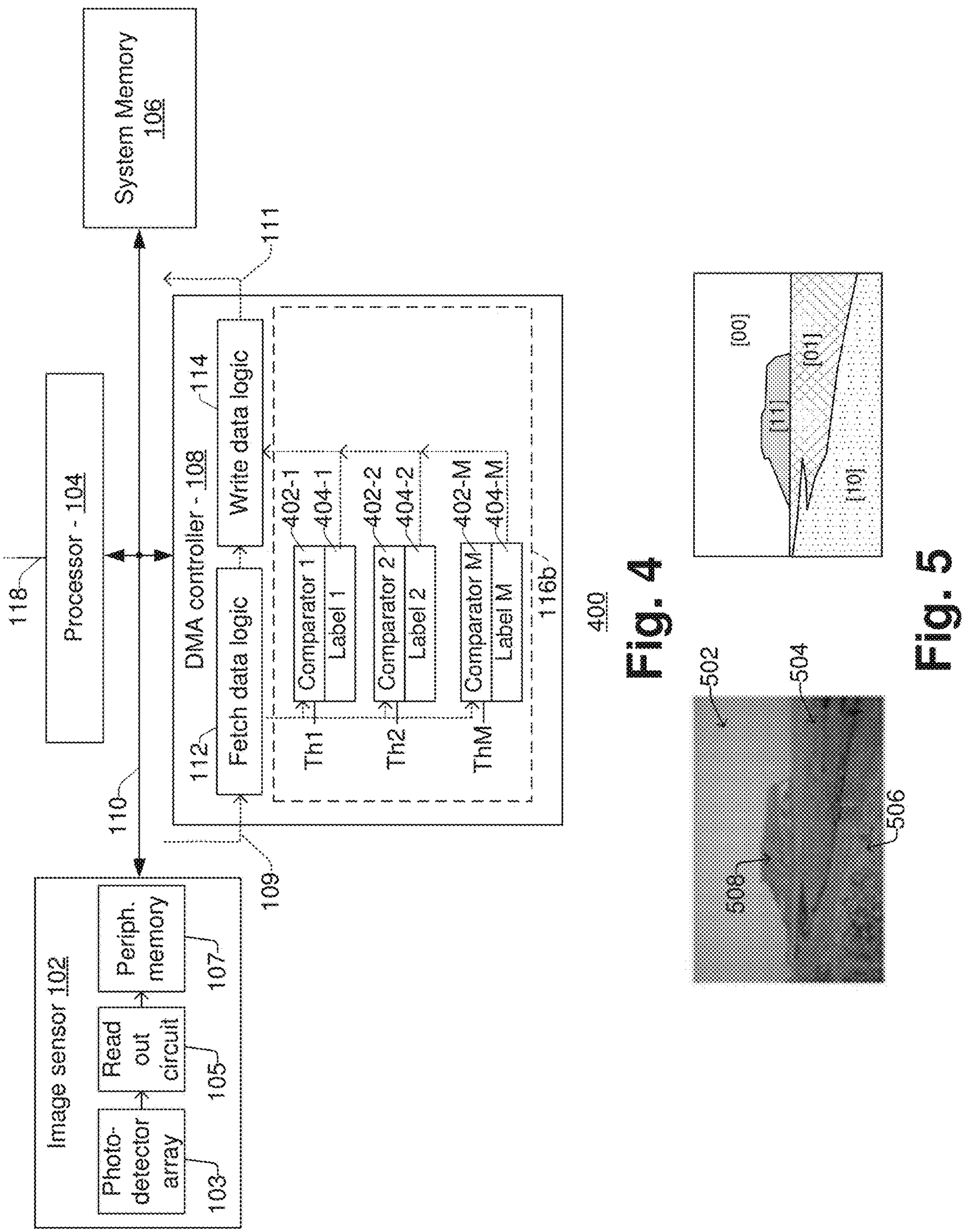
FIG. 4 illustrates an image processing system that includes a DMA controller configured to accelerate image segmentation by appending pre-determined labels according to some embodiments.
FIG. 5 illustrates an example illustrating an image before segmentation and an image after segmentation.

Turning to FIG. 4, one can see a more detailed depiction of an image processing system 400 including in-line logic hardware 116*b* configured to accelerate image segmentation by appending pre-determined labels to pixel data for an entire image or for a portion of an image. In this example, in addition to fetch data logic 112 write data logic 114, the DMA controller 108 includes an integer number (M) of comparators 402 (e.g., 402-1 through 402-M) and M pre-determined label modules 404 (e.g., 404-1 through 404-M, respectively). The pre-determined label modules 404 provide pre-determined labels in the form of a fixed number of bits, where each pre-determined label is different from the other pre-determined labels. Each comparator 402 has a first input coupled to an output of the fetch data logic 112, and a second input configured to receive one of M threshold values (e.g., Th1, Th2, . . . , ThM). Each comparator (e.g., first comparator 402-1) is configured to compare the respective fetched plurality of received light intensities of the retrieved raw pixel data from the fetch data logic 112 to a corresponding threshold value (e.g., first threshold value Th1) for that comparator. Each comparator then provides a comparison result that indicates whether the retrieved raw pixel data falls within a predetermined range for that comparator based on the threshold values. If the pixel data falls within a predetermined range of a given comparator, then the in-line logic hardware 116*b* appends the pre-determined label corresponding to that comparator to that pixel data and the write data logic 114 writes the pre-determined label to system memory 106. By appending labels in this fashion, the DMA controller 108 again saves processor overhead, and allows for faster image processing downstream in computer vision systems.

Figure 6:
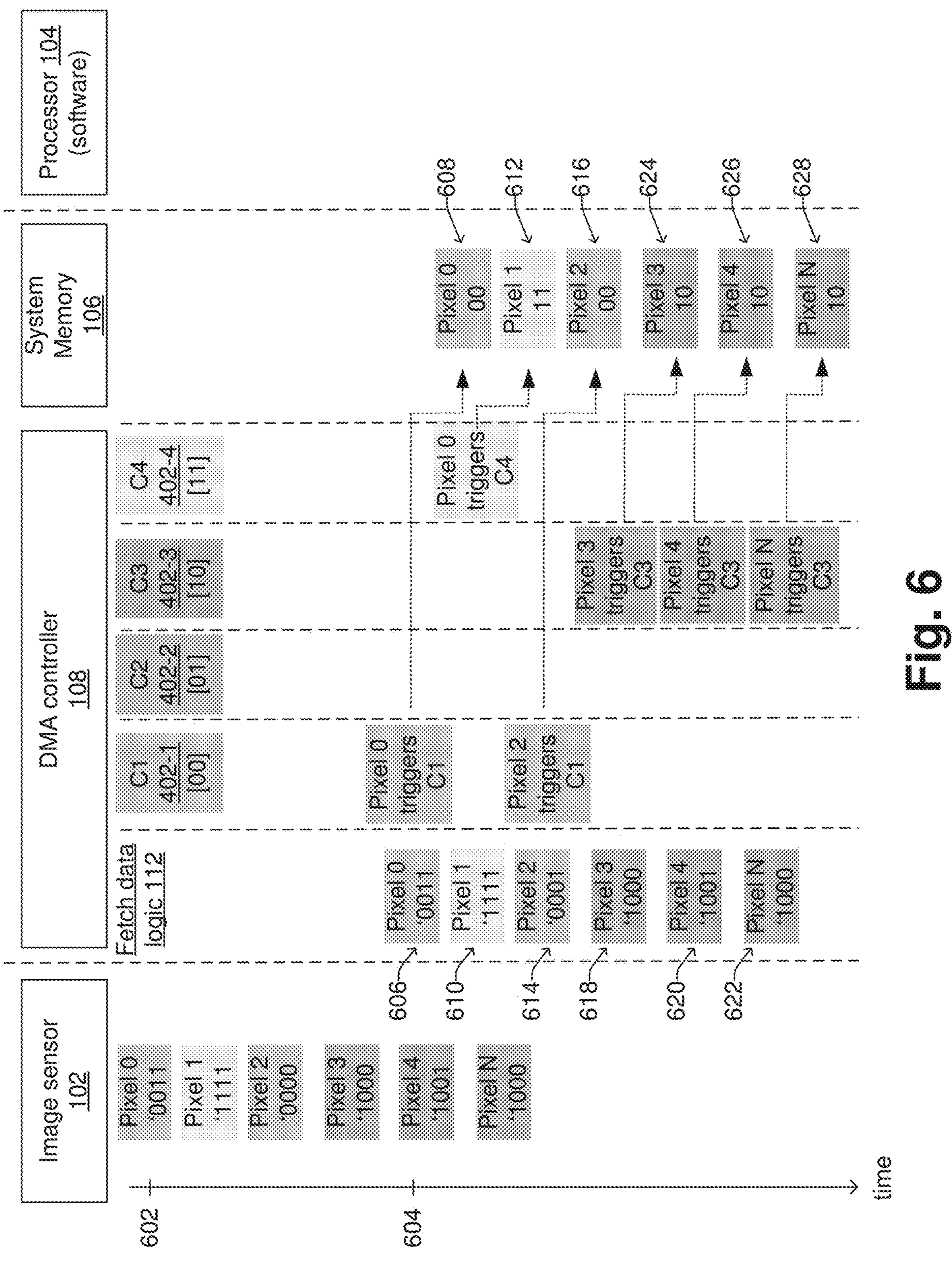
FIG. 6 illustrates a data processing diagram consistent with some examples of FIGS. 4-5.

FIG. 5 shows an example application where the image sensing system of FIG. 4 may find utility. The left-hand portion of FIG. 5 shows an image that depicts a sky 502, a body of water 504, a beach 506, and a mountain 508. By using image segmentation, the DMA controller 108 can append predetermined labels to the various pixel data based on color and/or light intensity thresholds of the various pixel data, thereby dividing the image into discrete, continuous regions of pixels. Thus, as shown in the right-hand portion of FIG. 5, after image processing, pixels in the upper portion of the image where "sky blue" light intensity was present have been labelled [00], pixels in the middle portion of the image where "ocean blue" light intensity was present have been labeled as [01], pixels in the lower portion of the image where "sandy" light intensity was present have been labeled [10], and pixels where "brown" light intensity was present have been labeled as [11]. It will be appreciated that the values [00], [01], and are merely an example for purposes of understanding, and other values can exist FIG. 6 illustrates another more detailed example of how raw pixel data can be processed in the image processing system 400 in time. This example shows N pixels (Pixel 0, Pixel 1, Pixel 2, . . . , Pixel N) being received starting at time 602 at the image sensor 102. In some instances, the raw data for the N pixels will be generated simultaneously (all pixels of the image are generated at one time), while in other cases, the raw data for the N pixels will be generated in serial (over time) as shown. When generated, each pixel has a respective color and/or light intensity, and the color and/or light intensities typically vary among the pixels. For illustrative purposes in this example, the color and/or light intensity of each pixel is illustrated as a four bit word, though more often, color and/or light intensities for a pixel will have larger number of bits, but smaller number of bits are also possible. For example, Pixel 1 has a very high light intensity (b'1111), while pixel 2 has a very low light intensity (b'0000).

At time 604, the DMA begins to fetch the pixel data from the image sensor over the bus structure. As the DMA controller fetches the pixel data (e.g., words), the comparators 402 acting in parallel compare the pixel data to the various thresholds (T1-TM). Because the thresholds are different (and typically span a full range of color and/or light intensities for the pixel data), the color and/or light intensity of a pixel will only activate one comparator, and only the pre-determined label for this comparator will be appended to the pixel data when written to the system memory 106. In FIG. 6's example, the color and/or light intensities are four bits and therefore span 16 values, and the predetermined labels are each two bits. Further, the first comparator C1 402-1 corresponds to a first predetermined label [00], the second comparator C2 402-2 corresponds to a second predetermined label [01], the third comparator C3 402-3 corresponds to a third predetermined label [10], and the fourth comparator C4 402-4 corresponds to a fourth predetermined label [11]. Further still, the first threshold (T1) has a value of b'0011 (decimal 3), the second threshold (T2) has a value of b'0111 (decimal 7), the third threshold (T3) has a value of b'1011 (decimal 11), and the fourth threshold (T4) has a value of b'1111 (decimal 15)— so in this example the thresholds are equally spaced over the color and/or light intensity span, though in other cases there could also be different spacing over the color and/or light intensity span. Therefore, the first comparator 402-1 is triggered when the color and/or light intensity of a pixel has a value of less than the first threshold (T1) and ranges from 0 up to and including 3; the second comparator 402-2 is triggered when the color and/or light intensity of the pixel has a value between the first and second thresholds (T1 and T2) and ranges from 4 up to and including 7; the third comparator 402-3 is triggered when the color and/or light intensity of a pixel has a value between the second and third thresholds (T2 and T3) and ranges from 8 up to and including 11; and the fourth comparator 402-4 is triggered when the color and/or light intensity of the pixel has a value greater than the third threshold (T3) and ranges from 12 up to and including 15.

Thus, in FIG. 6's example, as Pixel 0 with color and/or light intensity of b'0011 (decimal 3) is fetched at 606, the first comparator 402-1 is triggered and thus, the write data logic 114 writes pixel data with the first predetermined label to system memory 106 at 608. As Pixel 1 with color and/or light intensity b'1111(decimal 15) is fetched at 610, the fourth comparator 402-4 is triggered and thus, the write data logic 114 writes pixel data with the fourth predetermined label to system memory 106 at 612. As Pixel 2 with color and/or light intensity b'0001 (decimal 1) is fetched at 614, the first comparator 402-1 is again triggered and thus, the write data logic 114 writes Pixel 2 with the first predetermined label to system memory 106 at 616. As Pixel 3 through Pixel N are fetched at 618-622, the third comparator 402-3 is triggered in each case and thus, the write data logic 114 writes pixel data with the third predetermined label to system memory 106 for each pixel data at 624-628, respectively.

In this way, when the pixel data is written to system memory 106, the predetermined labels neatly segment the pixel data without the need for significant processor overhead, thereby accelerating downstream image processing operations. Thus, FIG. 6 depicts an example where the DMA controller 108 writes the pre-programmed labels to the memory in lieu of the retrieved raw pixel data, and the original retrieved raw pixel data is not written to system memory which saves bus bandwidth. In other implementations, the DMA controller 108 writes the pre-programmed labels to the system memory 106 along with the original retrieved raw pixel data. Further, in some cases, the pre-programmed labels and/or thresholds can be set by writing to a control register of the DMA controller, such that the pre-programmed labels and/or thresholds can change in time by changing software or firmware of the imaging system; while in other cases the pre-programmed labels and/or thresholds can be hard-coded.

Figure 7:
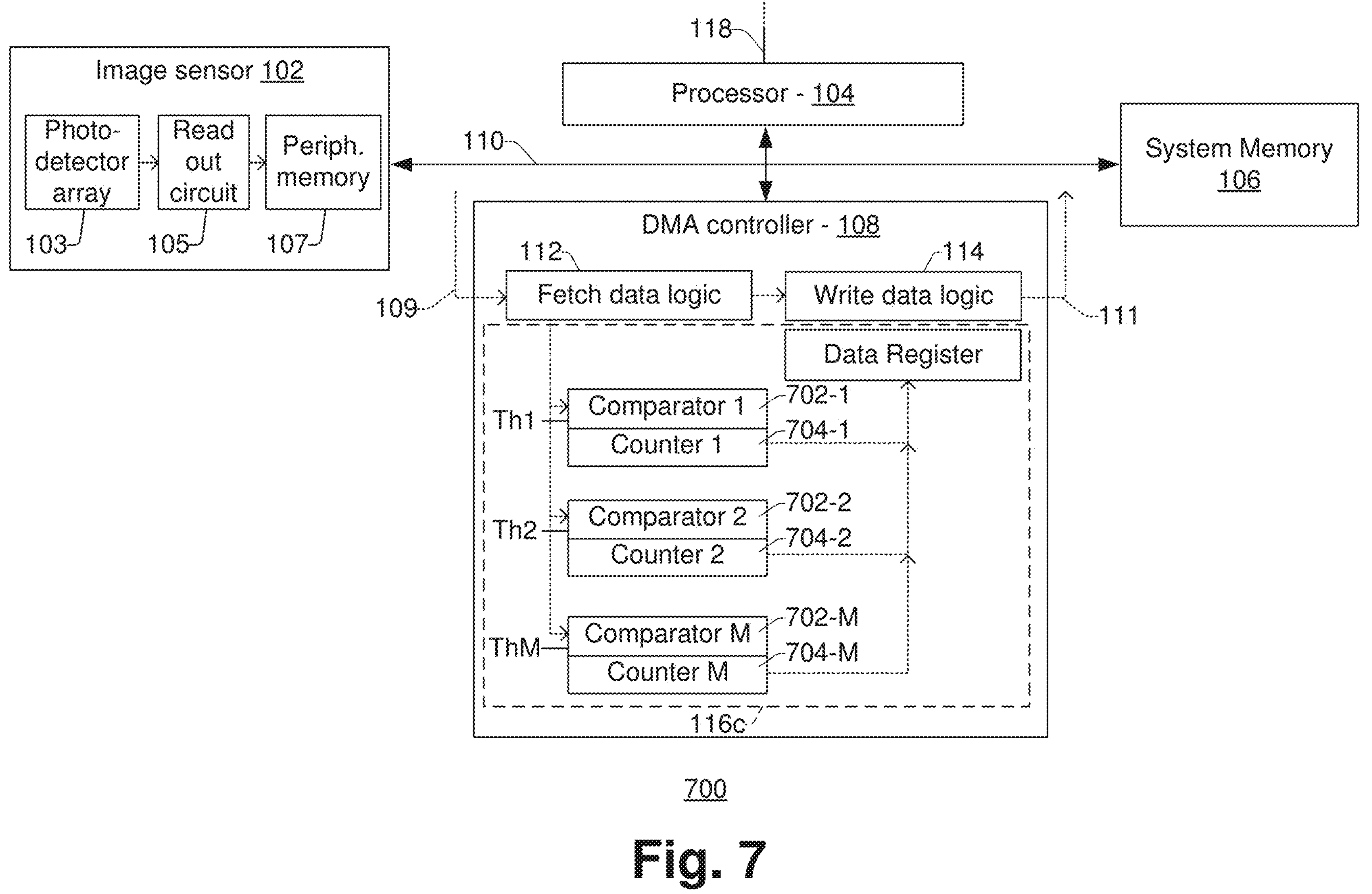
FIG. 7 illustrates an image processing system that includes a DMA controller configured to accelerate computation of a histogram.

Turning now to FIG. 7, one can see a more detailed depiction of another image processing system 700. This image processing system 700 includes in-line logic hardware 116*c* configured to accelerate computation of a histogram used in image processing. In this example, in addition to fetch data logic 112 write data logic 114, the DMA controller 108 includes an integer number (M) of comparators 702 (e.g., 702-1 through 702-M) and M counters 704 (e.g., 704-1 through 704-M, respectively). Each comparator 702 has a first input coupled to an output of the fetch data logic 112, and a second input configured to receive one of M threshold values (e.g., Th1, Th2, . . . , ThM). Each counter (e.g., first counter 704-1) is configured to increment only when its corresponding comparator (e.g., first comparator 702-1) indicates that a fetched received light intensities of the retrieved raw pixel data falls within a range identified by that comparator using the corresponding threshold value (e.g., first threshold value Th1). If the pixel data falls within a predetermined range for a given comparator, then the counter corresponding to that comparator increments, and if the pixel data fall outside of the predetermined range for that comparator, then the counter corresponding to that comparator does not increment. After being processed in-line by the DMA controller, the write data logic of the DMA controller writes the pixel data to the system memory 106.

Figure 8:
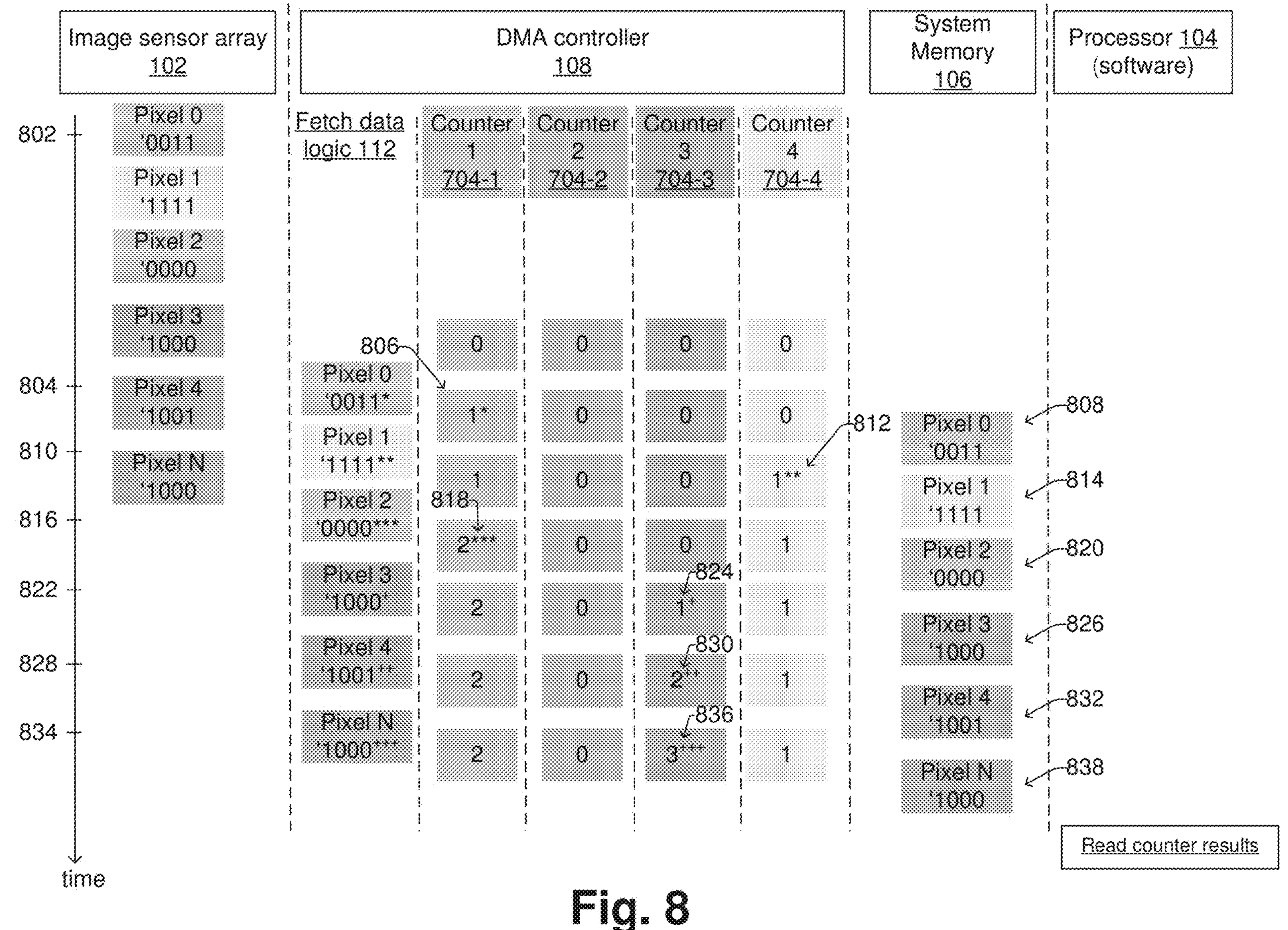
FIG. 8 illustrates a data processing diagram consistent with some examples of FIG. 7.

FIG. 8 illustrates another more detailed example where raw pixel data is processed in the image processing system 700 in time. This example shows N pixels (Pixel 0, Pixel 1, Pixel 2, . . . , Pixel N) being received starting at time 802 at the image sensor 102. In some instances, the raw data for the N pixels will be generated simultaneously (all pixels generated at one time), while in other cases, the raw data for the N pixels will be generated in serial (over time) as shown. When generated, each pixel has a respective light intensity, and the light intensities typically vary among the pixels. For illustrative purposes in this example, the light intensity of each pixel is illustrated as a four bit word, though more often, light intensities for a pixel will have larger number of bits, but smaller number of bits are also possible. For example, Pixel 1 has a very high light intensity (b'1111), while pixel 2 has a very low light intensity (b'0000).

At time 804, the DMA begins to fetch the pixel data from the image sensor over the bus structure. As the DMA controller fetches the pixel data (e.g., words), the comparators acting in parallel compare the pixel data to the various thresholds. Because the thresholds are different, the color and/or light intensity of a pixel will only active one comparator, and only one counter corresponding to this comparator is incremented for each pixel. For example, in FIG. 8's example, the first threshold has a value of b'0011 (decimal 3), the second threshold has a value of b'0111 (decimal 7), the third threshold has a value of b'1011 (decimal 11), and the fourth threshold has a value of b'1111 (decimal 15). Therefore, the first comparator 702-1 triggers the first counter 704-1 to increment only when the color and/or light intensity of a pixel has a value of 0 up to and including 3, the second comparator 702-2 triggers the second counter 704-2 to increment only when the color and/or light intensity of the pixel has a value of 4 up to and including 7, the third comparator 702-3 triggers the third counter 704-3 to increment only when the color and/or light intensity of the pixel has a value of 8 up to and including 11, and the fourth comparator 702-4 triggers the fourth counter 704-4 to increment only when the color and/or light intensity of the pixel has a value of 12 up to and including 15.

Thus, as Pixel 0 with color and/or light intensity of b'0011 (decimal 3) is fetched at time 804, and this color and/or light intensity is less than the first threshold T1, the first comparator triggers the first counter 704-1 to increment at 806. The write data logic 114 also writes Pixel 0 to system memory 106 at 808. As Pixel 1 with color and/or light intensity b'1111(decimal 15) is fetched at time 810, and this color and/or light intensity is greater than the third threshold T3, the fourth comparator 702-4 triggers the fourth counter 704-4 to increment at 812. At 814, the write data logic 114 writes Pixel 1 to system memory 106. As Pixel 2 with color and/or light intensity b'0001 (decimal 1) is fetched at time 816, the first comparator 702-1 again triggers the first counter 704-1 to increment at 818; and the write data logic writes Pixel 2 to system memory 106 at 820. As Pixel 3 with color and/or light intensity b'1000 (decimal 8) is fetched at time 822, the third comparator 702-3 triggers the third counter 704-3 to increment at 824; and the write data logic writes Pixel 3 to system memory 106 at 826. As Pixel 4 with color and/or light intensity b'1001 (decimal 9) is fetched at time 828, the third comparator 702-3 again triggers the third counter 704-3 to increment at 830; and the write data logic writes Pixel 4 to system memory 106 at 832. As Pixel N with color and/or light intensity b'1000 (decimal 8) is fetched at time 834, the third comparator 702-3 triggers the third counter 704-3 to increment at 836; and the write data logic writes pixel data N to system memory 106 at 838.

In this way, when the pixel data is written to system memory 106, the DMA controller 108 can display the value of the M counters to status registers of the DMA controller. By processing the pixel data in-line within the DMA controller in this fashion, the DMA controller 108 again saves processor overhead, and allows for faster image processing downstream in computer vision systems.

While the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. An image processing system, comprising:
- an image sensor;
- a bus structure coupled to the image sensor;
- a system memory coupled to the image sensor via the bus structure; and
- a direct memory access (DMA) controller coupled to the bus structure, the DMA controller including:
  - fetch data logic hardware circuit coupled directly to the bus structure and configured to retrieve raw pixel data from the image sensor,
  - write data logic hardware circuit coupled directly to the bus structure and configured to write the retrieved raw pixel data to the system memory, and
  - in-line logic hardware coupled between the fetch data logic hardware circuit and the write data logic hardware circuit and configured to internally process the retrieved raw pixel data thereby providing processed pixel data, wherein the in-line logic hardware includes an integrator hardware circuit having an input coupled to an output of the fetch data logic hardware circuit and a data register having an input coupled to an output of the integrator hardware circuit, the data register configured to provide an integration result from the integrator hardware circuit to the bus structure.

2. The image processing system of claim 1, further comprising:
- an analog to digital converter configured to convert an analog image signal from the image sensor to a multibit digital image signal corresponding to the retrieved raw pixel data;
- wherein the retrieved raw pixel data comprises a plurality of received light intensities for a plurality of pixels, respectively, and each of the plurality of received light intensities correspond to the plurality of pixels, respectively, during a first image timeslot corresponding to a first image.

3. The image processing system of claim 2, wherein the fetch data logic hardware circuit is configured to fetch the plurality of received light intensities of the retrieved raw pixel data from the image sensor, and wherein the integrator hardware circuit is configured to sum the fetched plurality of received light intensities of the retrieved raw pixel data to determine the integration result; and wherein the data register is configured to display the integration result at an end of the first image timeslot.

4. The image processing system of claim 2, wherein the fetch data logic hardware circuit is configured to fetch the plurality of received light intensities of the retrieved raw pixel data from the image sensor, and wherein the integrator hardware circuit is configured to sum the fetched plurality of received light intensities of the retrieved raw pixel data to determine the integration result; and wherein the write data logic hardware circuit is configured to write the retrieved raw pixel data to the system memory as the retrieved raw pixel data is fetched from the image sensor, and after the integration result is determined the write data logic hardware circuit is configured to write the integration result to the system memory.

5. The image processing system of claim 3, further comprising:

a processor coupled to the system memory via the bus structure, the processor configured to perform a divide operation whereby the integration result is divided by a number of pixels in the retrieved raw pixel data to obtain a mean for the retrieved raw pixel data.

6. An image processing system, comprising:

a processor;

a system memory;

an image sensor comprising an array of photodetectors, a read-out circuit, and a peripheral memory, the image sensor configured to receive a plurality of pixels corresponding to a first image;

a bus structure coupled to the processor, the system memory, and the image sensor; and a direct memory access (DMA) controller coupled to the processor, the system memory, and the image sensor via the bus structure, the DMA controller including:

a fetch data logic hardware circuit coupled directly to the bus structure, a write data logic hardware circuit coupled directly to the bus structure, and in-line logic hardware having an input coupled to an output of the fetch data logic hardware circuit and having an output coupled to an input of the write data logic hardware circuit, wherein the fetch data logic hardware circuit is configured to retrieve the plurality of pixels corresponding to the first image from the image sensor over the bus structure, and while some of the plurality of pixels corresponding to the first image are being retrieved, the fetch data logic hardware circuit is configured to concurrently internally process other pixels of the plurality of pixels, and the write data logic hardware circuit is configured to concurrently write still other pixels of the plurality of pixels to the system memory.

7. The image processing system of claim 6, wherein the plurality of pixels correspond to a plurality of measured light intensities, respectively, and the fetch data logic hardware circuit is configured to fetch the plurality of measured light intensities from the image sensor, wherein the DMA controller further comprises:

an integrator hardware circuit having an input coupled to an output of the fetch data logic hardware circuit and configured to sum the fetched plurality of measured light intensities of the plurality of pixels to determine a multi-bit integration result for the first image; and a data register having an input coupled to an output of the integrator hardware circuit, and configured to display the multi-bit integration result for the first image.

8. The image processing system of claim 6, wherein the plurality of pixels correspond to a plurality of measured color and/or light intensities, respectively, the fetch data logic hardware circuit is configured to fetch a measured color and/or light intensity corresponding to a pixel from the image sensor, and wherein the DMA controller further comprises:

a first comparator hardware circuit having a first comparator input coupled to an output of the fetch data logic hardware circuit and a second comparator input configured to receive a first threshold value, the first comparator hardware circuit configured to compare the measured color and/or light intensity to the first threshold value and provide a first comparison result based on the comparison of the measured color and/or light intensity and the first threshold value; and a first pre-determined label hardware circuit configured to selectively write pixel data including a first predetermined multi-bit label to the system memory based on the first comparison result;

a second comparator hardware circuit having a third comparator input coupled to the output of the fetch data logic hardware circuit and a fourth comparator input configured to receive a second threshold value that differs from the first threshold value, the second comparator hardware circuit configured to compare the measured color and/or light intensity to the second threshold value and provide a second comparison result based on the comparison of the measured color and/or light intensity and the second threshold value; and a second pre-determined label hardware circuit configured to selectively write pixel data including a second predetermined multi-bit label that differs from the first predetermined multi-bit label to the system memory based on the second comparison result.

9. The image processing system of claim 6, wherein the fetch data logic hardware circuit is configured to fetch a pixel of the plurality of pixels from the image sensor, and the DMA controller further comprises:

a first comparator hardware circuit having a first comparator input coupled to an output of the fetch data logic hardware circuit and a second comparator input configured to receive a first threshold value, the first comparator hardware circuit configured to compare a light intensity of the pixel to the first threshold value to provide a first comparison result;

a first counter hardware circuit having a first counter input coupled to an output of the first comparator hardware circuit, the first counter hardware circuit configured to increment a first count value based on the first comparison result;

a second comparator hardware circuit having a third comparator input coupled to the output of the fetch data logic hardware circuit and a fourth input configured to receive a second threshold value that differs from the first threshold value, the second comparator hardware circuit configured to compare the light intensity of the pixel to the second threshold value to provide a second comparison result; and a second counter hardware circuit having a second counter input coupled to the output of the second comparator hardware circuit, the second counter hardware circuit configured to increment a second count value based on the second comparison result.

10. An image processing system, comprising:

an image sensor;

a bus structure coupled to the image sensor;

a system memory coupled to the image sensor via the bus structure;

an analog-to-digital converter configured to convert an analog image signal from the image sensor to a multi-bit digital image signal; and a direct memory access (DMA) controller coupled to the bus structure, the DMA controller including:

fetch data logic hardware circuit coupled directly to the bus structure and configured to retrieve raw pixel data corresponding to the multi-bit digital image signal from the analog-to-digital converter, wherein the retrieved raw pixel data comprises a plurality of received light intensities for a plurality of pixels, respectively, and each of the plurality of received light intensities correspond to the plurality of pixels, respectively, during a first image timeslot corresponding to a first image;

write data logic hardware circuit coupled directly to the bus structure and configured to write the retrieved raw pixel data to the system memory; and in-line logic hardware coupled between the fetch data logic hardware circuit and the write data logic hardware circuit and configured to internally process the retrieved raw pixel data thereby providing processed pixel data, wherein the in-line logic hardware includes a comparator hardware circuit having a first input coupled to an output of the fetch data logic hardware circuit and a second input configured to receive a threshold value, the comparator hardware circuit configured to compare the respective plurality of received light intensities of the retrieved raw pixel data to the threshold value and provide a plurality of comparison results, respectively.

11. The image processing system of claim 10, wherein the fetch data logic hardware circuit is configured to fetch the plurality of received light intensities of the retrieved raw pixel data from the image sensor, wherein the comparator hardware circuit is configured to compare the respective plurality of received light intensities of the retrieved raw pixel data to the threshold value and provide a plurality of comparison results, respectively; and wherein the write data logic hardware circuit is configured to write a plurality of pre-programmed labels to the system memory based on the plurality of comparison results, respectively, wherein each pre-programmed label is selected from a number of predetermined light intensity ranges based on the comparison result of a received light intensity and the threshold value.

12. The image processing system of claim 11, wherein the DMA controller is configured to write the pre-programmed labels to the system memory rather than the retrieved raw pixel data.

13. The image processing system of claim 10, wherein the fetch data logic hardware circuit is configured to fetch the plurality of received light intensities of the retrieved raw pixel data from the image sensor, and the DMA controller further comprises:

a first comparator hardware circuit having a first input coupled to an output of the fetch data logic hardware circuit and a second input configured to receive a first threshold value, the first comparator hardware circuit configured to compare the respective plurality of received light intensities of the retrieved raw pixel data to the first threshold value to provide a first comparison result;

a first counter hardware circuit having an input coupled to an output of the first comparator hardware circuit and configured to increment a first count value based on the first comparison result;

a second comparator hardware circuit having a third input coupled to the output of the fetch data logic hardware circuit and a fourth input configured to receive a second threshold value that differs from the first threshold value, the second comparator hardware circuit configured to compare the respective plurality of received light intensities of the retrieved raw pixel data to the second threshold value and provide a second comparison result; and a second counter hardware circuit having an input coupled to an output of the second comparator hardware circuit and configured to increment a second count value based on the second comparison result.

14. The image processing system of claim 13, wherein the DMA controller is configured to write the retrieved raw pixel data to the system memory as the retrieved raw pixel data is fetched from the image sensor, and wherein the DMA controller is configured to write the first and second count values to a data register of the DMA controller.

15. The image processing system of claim 13, wherein the DMA controller is configured to write the retrieved raw pixel data to the system memory as the retrieved raw pixel data is fetched from the image sensor, and wherein the DMA controller is configured to write the first and second count values to the system memory.

* * * * *